Dec. 14, 1926.                                                          1,610,725
L. ANDREWS
MEANS FOR THE GRADING OF POWDERED MATERIAL BY ELUTRIATION OR
HYDRAULIC CLASSIFICATION
Filed March 17, 1925
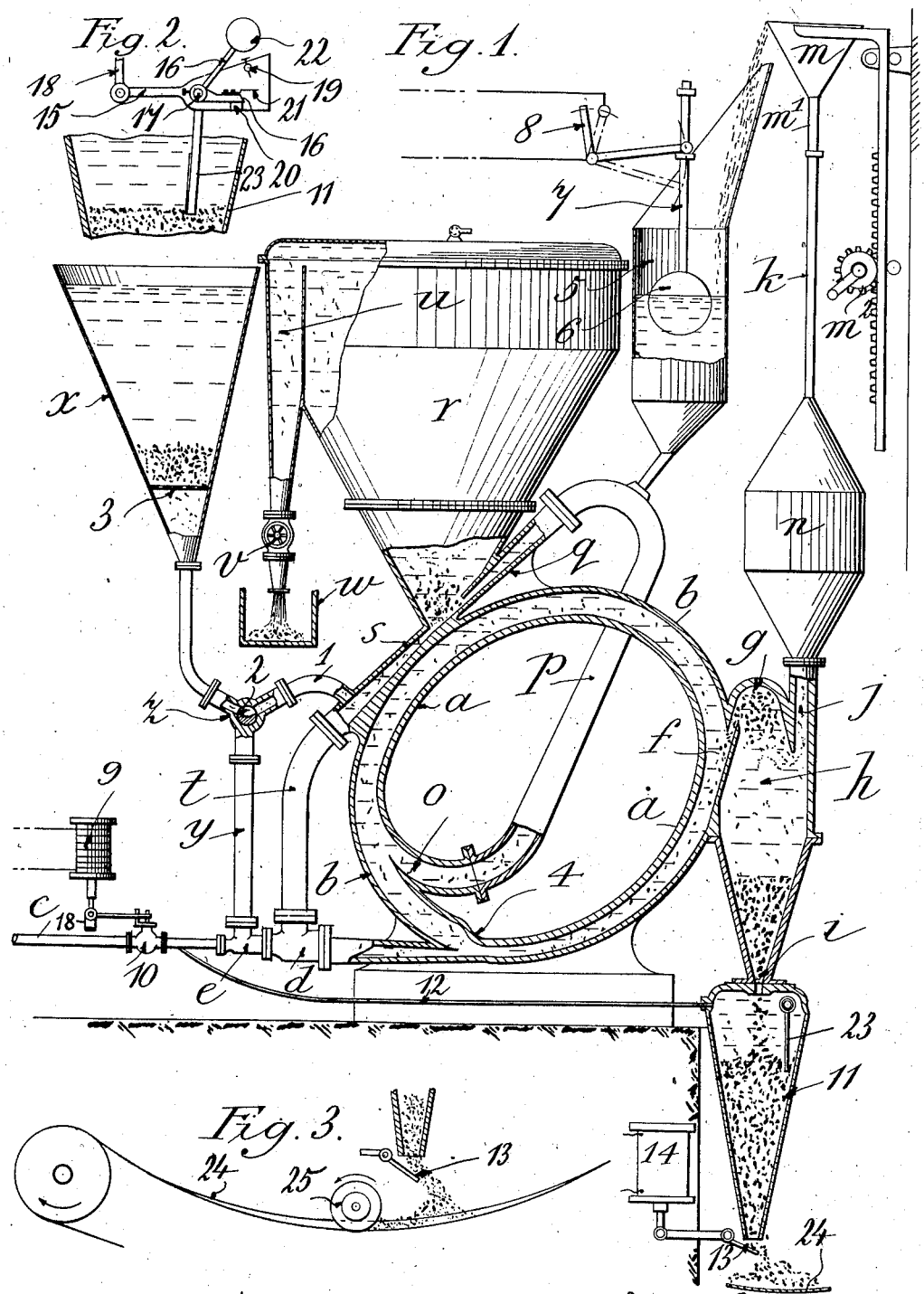

Patented Dec. 14, 1926.

1,610,725

UNITED STATES PATENT OFFICE.

LEONARD ANDREWS, OF WESTMINSTER, ENGLAND.

MEANS FOR THE GRADING OF POWDERED MATERIAL BY ELUTRIATION OR HYDRAULIC CLASSIFICATION.

Application filed March 17, 1925, Serial No. 16,197, and in Great Britain March 25, 1924.

For use in the arts and manufactures, it is often necessary to provide powdered material that is of a very high degree of fineness and is homogeneous in character.

As instances of such material, there may be mentioned pigments, abrasives, pottery slips, fuller's earth, fillers for asphalt in road making and so forth.

The present invention has for its object to enable the grading of finely ground material in a wet condition, to be effected in such a way that material of the required degree of fineness and homogeneity can be obtained in a more rapid, advantageous and economical manner than heretofore.

For this purpose according thereto, finely ground wet material (hereinafter called for brevity raw material) is delivered from a feed hopper into a stream of water that is supplied through a valve controlled supply pipe and delivered in an intermittent manner and under pressure into a vortex chamber or channel wherein the particles of raw material are caused, by centrifugal action, to be graded, coarse material being delivered with water through an outlet into a collecting receptacle and fine material, mixed with water and with more or less material of an intermediate degree of fineness (hereinafter called for distinction semi-coarse material), being delivered into the lower end of a chamber (hereinafter called the siphon chamber) wherein water carrying fine material rises and overflows into another or settling receptacle, whilst semi-coarse material will fall to the bottom of the siphon chambers. The water flowing off with the coarse material is caused to rise into a chamber (hereinafter called the overflow chamber) whence it flows into a float chamber that is in communication with the vortex chamber or channel or siphon chamber. The float chamber contains a float adapted, by the varying level of water in such chamber, to cause the intermittent opening and closing of the valve in the pipe for delivering water under pressure, together with raw material, into the vortex chamber or channel (hereinafter called the vortex chamber). The feed hopper may be provided with a sieve of suitable mesh for arresting ground material of too large a size to be advantageously dealt with.

Means may be provided for controlling the rate of flow of water from the siphon chamber to the settling chamber. Means may be provided for facilitating separation of semi-coarse material from fine material in the water flowing to the overflow chamber. The latter chamber may be made vertically adjustable, to suit the kinetic head or pressure of the liquid mixture delivered from the vortex chamber and enable the overflow to take place. Also, means may be provided for causing water to flow upward through the feed hopper when the main supply of water is cut off, in order to prevent settlement of raw material in such hopper and to break up flocculent material therein. Also, means may be provided for causing water to flow upward in an intermittent manner through the collecting receptacle, in order to remove fine material from the coarse material therein. Associated with the latter chamber may be provided a final discharge chamber for coarse material, and means for automatically opening and closing the latter chamber.

Apparatus suitable for effecting the grading of finely divided wet material according to the invention, can be constructed in various forms, one example being illustrated in Fig. 1 of the accompanying drawings which is a semi-diagrammatic part sectional view of the general arrangement. Figs. 2 and 3 are views of supplementary means hereinafter referred to.

As here shown, the vortex chamber is formed between inner and outer walls $a$, $b$ so as to form an endless channel of more or less annular shape. Arranged between a valve-controlled high pressure water supply pipe $c$ and the lower end portion of the vortex chamber are two ejector nozzles $d$, $e$ arranged in series and the forward of which $d$ is arranged tangentially to the channel so as to cause water to circulate around the same at a high speed. At one side of the vortex channel and at the outer side thereof, is an upwardly inclined outlet $f$ leading to the upper concave end $g$ of a coarse material collecting chamber $h$ the lower portion of which is of conical shape having an outlet $i$ at the bottom for coarse materials and a laterally arranged vertical outlet $j$ at the top communicating through a vertical pipe $k$ with an overflow chamber $m$, that may be of inverted conical shape, and serving for the passage of water with fine material from the collecting chamber $h$. The vertical pipe $k$ is provided, intermediate of its length, with an expansion chamber $n$ of double conical shape to facilitate separation of any semi-coarse material present, from the fine material flowing with the water to the overflow chamber $m$. The latter chamber, with a lower tubular extension $m^1$ thereof, may be made vertically adjustable in the said vertical pipe, as by a rack and pinion $m^2$ for the purpose hereinbefore referred to. At another portion of the annular vortex channel is an outlet passage $o$ through which water carrying fine and semi-coarse material can escape from the said channel. The outlet passage $o$ is connected by a bent pipe $p$, to a nozzle $q$ arranged to direct the escaping water laterally and at relatively high speed into the lower end of a conical siphon chamber $r$ of large capacity arranged above the vortex chamber so that the water will enter the siphon chamber and set up eddies or a whirling motion in the water therein. Opposite to the said nozzle $q$ and extending in an inclined downward direction therefrom is a nozzle-shaped outlet $s$ (hereinafter called for distinction nozzle $s$) having its larger lower end connected by a pipe $t$ to the ejector nozzle $d$ and through which semi-coarse material can flow from the bottom of the siphon chamber $r$ which is inclined, into nozzle $d$. The siphon chamber has extending downward from its upper end an external conduit $u$ provided with a controlling valve $v$ and delivering into a trough $w$ leading to a settling chamber. Arranged in any convenient position is a feed hopper $x$ into which the raw material to be treated is delivered and from which the raw material is delivered by a down-take pipe $y$ into the ejector nozzle $s$. The down-take pipe $y$ is connected through a three-way junction piece and a branch pipe 1, to the nozzle $s$, the junction piece being provided with a hand operated valve 2 whereby the ejector nozzle $d$ can be placed in communication, at will, with the feed hopper $x$ or with the nozzle $s$, or with both nozzle $s$ and feed hopper $x$ simultaneously. The feed hopper $x$ may be provided near its lower end with a horizontal sieve 3 of suitable mesh.

The annular vortex channel may be contracted in cross sectional area as at the point 4 where the water with raw material enters it, thereby inducing a circulation of water and solid material in the vortex chamber.

Arranged adjacent to the siphon chamber $r$, and below the outlet of the overflow chamber $m$, is a float chamber 5 the lower end of which is connected to the bent pipe $p$ connecting the outlet $o$ from the vortex channel to the siphon chamber $r$. Within the float chamber 5 is a float 6 connected to a rod 7, adapted, by the rise and fall of the float, either to operate an electric switch 8 controlling an electro-magnetic device 9 for closing and opening the valve 10 in the water supply pipe $c$, or to mechanically operate such valve.

Arranged below and communicating with the collecting chamber $h$ for coarse material is a second receptacle 11 (hereinafter called the sand receptacle) from which the coarse material is finally discharged. The coarse material carried by centrifugal force and gravity into the collecting receptacle $h$ is prevented from descending immediately into the sand receptacle 11 below by a small auxiliary stream of water derived from the pipe $c$ by piping 12, which is caused to flow upwards through the small outlet $i$ at the bottom of the collecting chamber. This stream keeps the coarse particles, collected above the small outlet, in a constant state of agitation so long as it continues, washing out any fine particles remaining with the coarse ones. The accumulated coarse particles also serve as a sand seal effectually to prevent any fine particles suspended in the water above, from being carried into the sand receptacle 11 below. As the auxiliary stream is controlled by the same valve 10 that controls the ejector nozzles $d$, $e$, the upward flow of this stream also ceases simultaneously with the cessation of the circulation in the vortex chamber, whereupon coarse material is allowed to gravitate into the sand receptacle 11.

To discharge the coarse material from the sand receptacle and to prevent a large quantity of the water in the apparatus flowing out at the same time, the said sand receptacle 11 may be made of inverted conical shape and of small cross sectional area, and be provided at its lower extremity with an outlet valve 13 through which the coarse material can be allowed to flow. A considerable quantity of coarse material may be allowed to accumulate above the valve before opening it, thus forming a sand seal. The valve 13 (hereinafter called for distinction the sand valve) should be closed before sufficient coarse material has run out to break the seal. It may be operated automatically and the sand seal maintained within the desired limits, by any convenient means. For this purpose, the sand valve 13 may be operated by an electro-magnetic device 14, the circuit of which is controlled by an electric switch as shown more particularly in Fig. 2 comprising, for example two switch levers 15, 16 which may be mounted to rotate about a common center 17. One arm of the lever 15 is connected mechanically to a movable part of the means used for controlling the main water valve say by a rod 18 to the lever controlling valve 10, in such a manner that the lever will be partially rotated in a forward and backward direction, each time the main water valve 10 is opened and closed. The second arm of the said lever 15 carries an insulated contact 19 and also a lateral supporting lug.

The second lever 16 comprises two arms one of which is arranged normally to rest upon the lug 20 on the second arm of the first lever 15 and carries an insulated contact 21 and the second arm of the lever 16, which may be inclined upward, is weighted as at 22 or otherwise loaded. The lever 16 is connected to a spindle which spindle constitutes the common center 17 referred to and is carried into the upper portion of the sand receptacle 11 where it is provided with a vane 23 which moves freely when surrounded only by water but becomes anchored or fixed by the coarse material as soon as this accumulates in the said receptacle 11 to a sufficient height to surround the vane 23. The arrangement is such that the levers 15, 16 can rotate together and keep the switch contacts 19, 21 which are associated with the circuit of the electro-magnetic device 14, apart so long as the vane 23 is free to move but as soon as the second lever 16 is anchored by the coarse material, the first lever 15 rotates relatively thereto with the result that an electric circuit is closed through the electro-magnetic device 14 and the sand valve 13 opened, the valve being closed by a spring or weight or otherwise, as soon as the sand falls below the vane and the switch levers are thus rendered free to assume their original relative positions and open the said electric circuit. The sand valve 13 will thus be opened each time the main water valve 10 is operated, so long as the vane 23 remains anchored, but ceases to be opened as soon as the sand has fallen sufficiently to release the vane.

The coarse material discharged from the sand receptacle 11 may be carried to a mill by any suitable conveyor for further grinding. Where, however, the coarse material or sand is required to be as free as possible from water before being conveyed to the mill, the bulk of the small quantity of water flowing out with the sand may be drained off by allowing the sand valve to discharge on to a belt conveyor in which a pocket is formed between the end rollers of the conveyor by depressing the belt 24 immediately below or adjacent to the sand discharge, it may be by means of a spherically shaped roller 25 as shown in Fig. 3 or by the weight of the discharged material, the adjacent end roller being suitably arranged for the purpose. The sand will then be found to cling to the surface of the belt and be carried away by it, whereas the water will remain in the pocket and eventually, as it accumulates, flow over the sides of the belt.

The arrangement is such that whilst water is being delivered into the vortex chamber $a$, $b$ a suction action will be set up in the feed hopper $x$ and water will flow from the vortex chamber with coarse material into the collecting chamber $h$ from which water will rise into and overflow from the overflow chamber $m$ into the float chamber 5 until the float rises to a predetermined height when it will cause the water supply valve 10 to close, thereby cutting off the supply of water and raw material to the vortex chamber. The water in the overflow chamber $m$ and in the float chamber 5 will then fall, passing partly into and through the siphon chamber $r$ and partly into the feed hopper $x$ until it reaches a predetermined lower level in the overflow and float chambers, thereby causing the re-opening of the water valve 10, whereupon the above described operations will be repeated. In this way a pulsating or ebb and flow action will be set up in parts of the apparatus but not in the siphon chamber $r$ through which water with fine material will continuously flow when the apparatus is in use. By adjusting the high and low limits of movement of the float 6, the periodicity of ebb and flow can be varied to any desired extent. By reason of the ebb and flow, permanent lodgment of semi-coarse material in parts of the apparatus will be avoided and in the case of the feed hopper, it will aid in keeping the sieve 3 therein, when used, clean.

What I claim is:—

1. Means of the kind herein referred to comprising a feed hopper for material to be graded, a vortex chamber having two delivery outlets, a water supply pipe, a valve in said pipe, ejector means adapted to simultaneously supply material from the hopper and water from the pipe to said vortex chamber, a coarse material collecting chamber in communication with one of said vortex chamber outlets, an overflow chamber connected to the coarse material collecting chamber, a float chamber, in communication with the vortex chamber, arranged to receive the overflow from the overflow chamber, a float in the latter and means operatively associated with the water valve and float whereby movement of the latter due to varying level of water therein causes intermittent opening and closing of such valve.

2. Means according to claim 1 in which the overflow chamber is adjustable in height, substantially as described.

3. Means of the kind herein referred to, comprising a feed hopper for material to be graded, a vortex chamber having an inlet and an outlet, a siphon chamber in communication with the vortex chamber through such outlet, means connecting the siphon chamber to the vortex chamber inlet, ejector means communicating with both the feed hopper and siphon chamber and with the vortex chamber inlet, a source of water under pressure for operating said ejector means and controlling means whereby the ejector means, feed hopper and siphon chamber can be operatively associated in different relationships.

4. In combination, a feed hopper; a vortex chamber having an inlet and two outlets, an overflow chamber connected to one of said outlets, a siphon chamber connected to the second of said outlets, a float chamber adapted to receive liquid from the overflow chamber, ejector means connected to the feed hopper, siphon chamber and vortex chamber inlet, a source of water under pressure leading to the ejector means, and a float in the float chamber adapted to intermittently establish and interrupt the water supply, the arrangement being such that a pulsating action is set up in parts of the apparatus other than in the siphon chamber, substantially as described.

Signed at London, England this fifth day of March 1925.

LEONARD ANDREWS.